(12) United States Patent
Tang et al.

(10) Patent No.: US 11,397,772 B2
(45) Date of Patent: Jul. 26, 2022

(54) INFORMATION SEARCH METHOD, APPARATUS, AND SYSTEM

(71) Applicant: Beijing Sankuai Online Technology Co., Ltd, Beijing (CN)

(72) Inventors: Biao Tang, Beijing (CN); Gong Zhang, Beijing (CN); Jing Su, Beijing (CN); Tao Zhang, Beijing (CN); Sheng Zhu, Beijing (CN); Peixu Hou, Beijing (CN); Zhian Yu, Beijing (CN)

(73) Assignee: Beijing Sankuai Online Technology Co., Ltd., Beijing (CN)

( * ) Notice: Subject to any disclaimer, the term of this patent is extended or adjusted under 35 U.S.C. 154(b) by 305 days.

(21) Appl. No.: 16/621,704

(22) PCT Filed: Dec. 29, 2017

(86) PCT No.: PCT/CN2017/119765
§ 371 (c)(1),
(2) Date: Dec. 12, 2019

(87) PCT Pub. No.: WO2019/015262
PCT Pub. Date: Jan. 24, 2019

(65) Prior Publication Data
US 2021/0141839 A1 May 13, 2021

(30) Foreign Application Priority Data
Jul. 20, 2017 (CN) .................. 2017105968789.4

(51) Int. Cl.
*G06F 16/903* (2019.01)
*G06N 20/00* (2019.01)
(52) U.S. Cl.
CPC ....... *G06F 16/90335* (2019.01); *G06N 20/00* (2019.01)

(58) Field of Classification Search
CPC .......... G06F 16/90335; G06F 16/9535; G06F 16/2457; G06F 16/334; G06F 16/338;
(Continued)

(56) References Cited

U.S. PATENT DOCUMENTS 8,359,300 B1   1/2013  Shin
2009/0307198 A1* 12/2009 Zhang ................. G06F 16/9537
(Continued)

FOREIGN PATENT DOCUMENTS

CN          102867031 A       1/2013
CN          104077324 A      10/2014
(Continued)

OTHER PUBLICATIONS

Korean Intellectual Property Office, Decision of Rejection issued in Application No. 10-2019-7035369, dated Jul. 8, 2021, 9 pages. (Submitted with Machine Translation).
(Continued)

*Primary Examiner* — Evan Aspinwall
(74) *Attorney, Agent, or Firm* — Kilpatrick Townsend & Stockton, LLP

(57) ABSTRACT

The present disclosure provides an information search method, apparatus, and system. The information search method includes: a search word sent by a user by using a client is received; search intention of the user is recognized according to feature information of the search word and/or search context feature information; search is performed by using a search policy corresponding to the recognized search intention and according to the search word to acquire information search results associated with the search word; and the information search results are sent to the client, so that the client displays the information search results.

13 Claims, 7 Drawing Sheets

(58) Field of Classification Search
CPC ...... G06F 16/93; G06N 20/00; G06N 3/0481; G06N 3/08; G06Q 30/0625
USPC ........................................................ 707/769
See application file for complete search history.

(56) References Cited

U.S. PATENT DOCUMENTS

| | | | |
|---|---|---|---|
| 2011/0264654 | A1 | 10/2011 | Wolosin et al. |
| 2015/0278358 | A1* | 10/2015 | Abib ..................... G06F 16/951 707/706 |
| 2015/0345970 | A1 | 12/2015 | Tanaka et al. |
| 2015/0347519 | A1* | 12/2015 | Hornkvist ............ G06F 16/9537 707/722 |
| 2017/0039269 | A1* | 2/2017 | Raff .................. G06F 16/90335 |
| 2017/0219367 | A1 | 8/2017 | Liu et al. |

FOREIGN PATENT DOCUMENTS

| | | |
|---|---|---|
| CN | 104937375 A | 9/2015 |
| CN | 105264528 A | 1/2016 |
| CN | 105468580 A | 4/2016 |
| CN | 106202260 A | 12/2016 |
| CN | 106919641 A | 7/2017 |
| CN | 107315841 A | 11/2017 |
| JP | 2011123564 A | 6/2011 |

OTHER PUBLICATIONS

ISA State Intellectual Property Office of the People's Republic of China, International Search Report Issued in Application No. PCT/CN2017/119765, dated Apr. 20, 2018, WIPO, 4 pages.

State Intellectual Property Office of the People's Republic of China, Office Action and Search Report Issued in Application No. 201710596879.4, dated Sep. 5, 2018, 30 pages,(Submitted with Machine Translation).

State Intellectual Property Office of the People's Republic of China, Office Action and Search Report Issued in Application No. 201710596879.4, dated Dec. 3, 2018, 28 pages,(Submitted with Partial Translation).

Ren Xingyi et al, "Point-of Interest Recommendation Based on the User Check-in Behavior", Chinese Journal of Computers, vol. 40, No. 1. Jan. 31, 2017, 24 pages.

Japanese Patent Office, Office Action issued in Application No. 2019-565394, dated Mar. 2, 2021, 7 pages. (Submitted with Machine Translation).

Korean Patent Office, Office Action issued in Application No. 10-2019-7035369, dated Dec. 18, 2020, 31 pages. (Submitted with Machine Translation).

State Intellectual Property Office of the People's Republic of China, Notice of Rejection of decision Issued in Application No. 2017105968794, dated Mar. 11, 2019, 29 pages, (Submitted with Machine Translation).

European Patent Office, Extended European Search Report Issued in Application No. 17918687.9, dated Apr. 2, 2020, Germany, 7 pages.

ISA State Intellectual Property Office of the People's Republic of China, Written Opinion of the International Searching Authority Issued in Application No. PCT/CN2017/119765, dated Apr. 20, 2018, WIPO, 11 pages.

European Patent Office, Office Action Issued in Application No. 17918687.9, dated Nov. 19, 2021, Germany, 4 pages.

* cited by examiner

INFORMATION SEARCH METHOD, APPARATUS, AND SYSTEM

CROSS-REFERENCE TO RELATED APPLICATIONS

This patent application is a U.S. National Stage of International Application No. PCT/CN2017/119765, filed on Dec. 29, 2017, designating the United States, which claims priority to Chinese Patent Applications No. 201710596879.4, entitled "INFORMATION SEARCH METHOD, APPARATUS, AND SYSTEM" and filed on Jul. 20, 2017, both of which are incorporated by reference in their entireties.

TECHNICAL FIELD

The present disclosure relates to the field of information search technology, and specifically, to an information search method, apparatus, and system.

BACKGROUND

At present, with the fast development of Internet of Things (IoT) technology, an increasingly large number of people can find and learn about offline scenic spots, merchants, and the like on the internet. A user uses a terminal such as a computer or a mobile phone to find offline scenic spots, merchants, and the like through an Online To Offline (O2O, an IoT concept that combines offline business opportunities and the internet) search engine to learn about scenic spots, promotion activities of merchants, and comments of previous customers or use online services such as booking a ticket, placing an order or making a payment.

Currently, O2O search engines provided in related technologies perform search mainly based on local information. For example, a user searches for a national hotel chain and can only obtain local search results. That is, only related search results in a current positioning city can be provided to the user.

However, during actual application, a user usually has many non-local search requirements. For example, before making a trip, the user usually needs to search for scenic spot information and hotel information of a destination city to, for example, book a ticket or a hotel. Existing O2O search engines usually cannot satisfy requirements of users. For example, when a user searches "Huashan" in Shanghai, obtained results are all about "Huashan Hospital". If the user intends to search for the scenic spot "Huashan", the user needs to manually switch the city, resulting in complex operations and relatively low efficiency.

Therefore, there is currently an urgent need for a technical solution that can satisfy non-local search requirements of users, thereby improving the efficiency of non-local search of users and improving user experience.

SUMMARY

In view of this, an objective of embodiments of the present disclosure is to provide an information search method, apparatus, and system.

According to a first aspect, an embodiment of the present disclosure provides an information search method applied to a server. The method includes: receiving a search word sent by a user by using a client; recognizing search intention of the user according to feature information of the search word and/or search context feature information; performing search by using a search policy corresponding to the recognized search intention and according to the search word to acquire information search results associated with the search word, where the information search results include a local search result and/or a non-local search result; and sending the information search results to the client, so that the client displays the information search results.

Optionally, recognizing search intention of the user according to feature information of the search word and/or search context feature information includes: acquiring the feature information of the search word and/or the search context feature information; determining non-local search preference of the user according to the feature information of the search word and/or the search context feature information and by using a pre-trained non-local search preference determination model; and determining the search intention of the user according to the non-local search preference and a preset preference threshold condition.

Optionally, the non-local search preference determination model is trained in the following manner including: constructing the non-local search preference determination model by using a feature variable of the search word and/or a search context feature variable as an independent variable and using a non-local search preference feature as a dependent variable; acquiring training samples generated according to a plurality of search click historical records; and training the non-local search preference determination model by using the training samples.

Optionally, constructing the non-local search preference determination model includes: constructing the non-local search preference determination model by using a logic regression model.

Optionally, constructing the non-local search preference determination model by using a logic regression model specifically includes: constructing the non-local search preference determination model by using the following Formula 1:

$$\text{remote}_{prob} = \text{sigmoid}(w_1 x_1 + w_2 x_2 + \ldots + w_n x_n), \quad \text{Formula 1:}$$

in the Formula 1, $\text{remote}_{prob}$ represents the non-local search preference feature, $x_n$ represents an eigenvalue of an n-th feature variable, $w_n$ represents a weight corresponding to the n-th feature variable, a weight corresponding to each feature variable is determined by training according to chosen training samples, the function sigmoid is a threshold function of a neural network, and the threshold function is used to map a variable into a value between 0 and 1.

Optionally, before the recognizing search intention of the user according to feature information of the search word and/or search context feature information, the method further includes: matching the search word against a preset local and non-local entity word library, to determine whether the search word has a possibility of non-local search; and if there is a possibility of non-local search, performing the step of recognizing search intention of the user according to feature information of the search word and/or search context feature information.

Optionally, performing search by using a search policy corresponding to the search intention and according to the search word to acquire information search results associated with the search word includes: if the search intention is that the user has both local search intention and non-local search intention, performing local search and non-local search according to the search word, to obtain the information search results including a plurality of local search results and a plurality of non-local search results.

Optionally, before sending the information search results to the client, the method further includes: incorporating the plurality of local search results into a local search result display region; incorporating the plurality of non-local search results into a non-local search result display region; determining a display order of the local search result display region and the non-local search result display region according to the non-local search preference of the user and/or quality of the local and non-local search results; and generating the information search results including the local search result display region and the non-local search result display region in the display order.

Optionally, the local search result display region is a collapsible display region, and after incorporating the plurality of local search results into a local search result display region, the method further includes: determining an order (sequence) of the plurality of local search results in the local search result display region according to pre-estimated click through rates of the local search results, and determining a quantity of local search results displayed when the local search result display region is in a collapsed state.

Optionally, in a case that the non-local search result display region is a collapsible display region, after incorporating the plurality of non-local search results into a non-local search result display region, the method may further include: determining an order of the plurality of non-local search results in the non-local search result display region according to a pre-estimated click through rate of each of the plurality of the non-local search results, and determining a quantity of non-local search results displayed when the non-local search result display region is in a collapsed state.

Optionally, the information search method may further include: acquiring a click operation log of the user on the information search results; and performing iterative optimization on the non-local search preference determination model according to the click operation log.

According to a second aspect, an embodiment of the present disclosure further provides an information search method applied to a client. The method includes: monitoring a search word entered by a user; sending the search word to a server; receiving information search results fed back by the server, where the information search results are obtained by the server through search by using a search policy corresponding to search intention of the user recognized according to feature information of the search word and/or search context feature information, and the information search results include a local search result and/or a non-local search result; and displaying the information search results.

Optionally, the information search results may include a local search result display region, a non-local search result display region, and a display order. The local search result display region may include one or more local search results, and the non-local search result display region may include one or more non-local search results. Correspondingly, the displaying the information search results may include: displaying the local search result display region and the non-local search result display region on the same screen of the client in the display order.

According to a third aspect, an embodiment of the present disclosure further provides an information search apparatus applied to a server. The apparatus includes: a search word receiving module configured to receive a search word sent by a user by using a client; a search intention recognition module configured to recognize search intention of the user according to feature information of the search word and/or search context feature information; a policy search module configured to perform search by using a search policy corresponding to the search intention and according to the search word to acquire information search results associated with the search word, where the information search results include a local search result and/or a non-local search result; and a search result sending module configured to send the information search results to the client, so that the client displays the information search results.

Optionally, the search intention recognition module is specifically configured to: acquire the feature information of the search word and/or the search context feature information; determine non-local search preference of the user according to the feature information of the search word and/or the search context feature information and by using a pre-trained non-local search preference determination model; and determine the search intention of the user according to the non-local search preference and a preset preference threshold condition.

Optionally, the non-local search preference determination model is trained in the following manner including: constructing the non-local search preference determination model by using a feature variable of the search word and/or a search context feature variable as an independent variable and using a non-local search preference feature as a dependent variable; acquiring training samples generated according to a plurality of search click historical records; and training the non-local search preference determination model by using the training samples.

Optionally, the non-local search preference determination model is constructed by using a logic regression model.

Optionally, the non-local search preference determination model is specifically constructed by using the following Formula 1:

$$\text{remote}_{prob} = \text{sigmoid}(w_1 x_1 + w_2 x_2 + \ldots + w_n x_n), \quad \text{Formula 1:}$$

in the formula, $\text{remote}_{prob}$ represents the non-local search preference feature, $x_n$ represents an eigenvalue of an n-th feature variable, $w_n$ represents a weight corresponding to the n-th feature variable, a weight corresponding to each feature variable is determined by training according to chosen training samples, the function sigmoid is a threshold function of a neural network, and the threshold function is used to map a variable into a value between 0 and 1.

Optionally, the information search apparatus further includes an entity word matching module configured to: match the search word against a preset local and non-local entity word library, to determine whether the search word has a possibility of non-local search, and if there is a possibility of non-local search, perform the step of recognizing search intention of the user according to feature information of the search word and/or search context feature information.

Optionally, the policy search module is specifically configured to: if the search intention is that the user has both local search intention and non-local search intention, perform local search and non-local search according to the search word, to obtain the information search results including a plurality of local search results and a plurality of non-local search results.

Optionally, the information search apparatus further includes: a result incorporation module configured to: incorporate the plurality of local search results into a local search result display region, and incorporate the plurality of non-local search results into a non-local search result display region; a display order determining module, configured to determine a display order of the local search result display region and the non-local search result display region according to the non-local search preference of the user and/or quality of the local and non-local search results; and a search result generation module, configured to generate the information search results including the local search result display region and the non-local search result display region in the display order.

Optionally, the local search result display region is a collapsible display region. In this case, the information search apparatus may further include a local order determining module configured to: determine an order of the local search results in the local search result display region according to pre-estimated CTRs of the local search results, and determine a quantity of local search results displayed when the local search result display region is in a collapsed state.

Optionally, the non-local search result display region is a collapsible display region. In this case, the information search apparatus may further include a non-local order determining module configured to: determine an order of the non-local search results in the non-local search result display region according to pre-estimated CTRs of the non-local search results, and determine a quantity of non-local search results displayed when the non-local search result display region is in a collapsed state.

Optionally, the information search apparatus further includes: an operation log acquisition module, configured to acquire a click operation log of the user on the information search results; and an iterative optimization module, configured to perform iterative optimization on the non-local search preference determination model according to the click operation log.

According to a fourth aspect, an embodiment of the present disclosure further provides an information search apparatus applied to a client. The apparatus includes: an input monitoring module, configured to monitor a search word entered by a user; a search word sending module, configured to send the search word to a server; a search result receiving module, configured to receive information search results fed back by the server, where the information search results are obtained by the server through search by using a search policy corresponding to recognized search intention after the search intention of the user is recognized according to feature information of the search word and/or search context feature information, and the information search results include a local search result and/or a non-local search result; and a search result display module, configured to display the information search results.

Optionally, the information search results may include a local search result display region, a non-local search result display region, and a display order. The local search result display region may include one or more local search results, the non-local search result display region may include one or more non-local search results. Correspondingly, the search result display module may be specifically configured to display the local search result display region and the non-local search result display region on the same screen of the client in the display order.

According to a fifth aspect, an embodiment of the present disclosure further provides an information search system. The system includes a server and a client. The server includes the apparatus in the third aspect. The client includes the apparatus in the fourth aspect.

According to a sixth aspect, an embodiment of the present disclosure further provides a computer device, including a memory, a processor, and computer programs stored in the memory and executable by the processor. When executing the computer programs, the processor is caused to perform the steps of the method in the first aspect.

According to a seventh aspect, an embodiment of the present disclosure further provides a computer device, including a memory, a processor, and computer programs stored in the memory and executable by the processor. When executing the computer programs, the processor is caused to perform the steps of the method in the second aspect.

According to an eighth aspect, an embodiment of the present disclosure further provides a computer readable storage medium. The computer readable storage medium stores computer programs. When executing the computer programs, a processor is caused to perform the steps of the method in the first aspect.

According to a ninth aspect, an embodiment of the present disclosure further provides a computer readable storage medium. The computer readable storage medium stores computer programs. When executing the computer programs, a processor is caused to perform the steps of the method in the second aspect.

The embodiments of the present disclosure provide the information search method applied to a server. The method includes: receiving a search word sent by a user by using a client; recognizing search intention of the user according to feature information of the search word and/or search context feature information; performing search by using a search policy corresponding to the search intention and according to the search word to acquire information search results associated with the search word; and sending the information search results to the client, so that the client displays the information search results. In the present disclosure, search intention of a user is recognized, and search is performed according to a corresponding search policy. For example, both local search and non-local search are performed, or only non-local search is performed, so that search results that better satisfy the intention of the user can be obtained. In this way, when intending to perform non-local search, the user can obtain non-local search results without needing to switch a current positioning city, thereby effectively improving search efficiency and improving user experience.

To make the foregoing objectives, features, and advantages of the present disclosure more comprehensible, preferred embodiments are described in detail below with reference to the accompanying drawings.

BRIEF DESCRIPTION OF THE DRAWINGS

To describe the technical solutions in the embodiments of the present disclosure more clearly, the following briefly describes the accompanying drawings required for describing the embodiments of the present disclosure. It should be understood that the accompanying drawings in the following description show merely some embodiments of the present disclosure and therefore should not be construed as a limitation to the scope. A person of ordinary skill in the art may still derive other drawings from these accompanying drawings without creative efforts.

DETAILED DESCRIPTION OF THE EMBODIMENTS

The following clearly and completely describes the technical solutions in the embodiments of the present application with reference to the accompanying drawings in the embodiments of the present application. Apparently, the described embodiments are merely some of the embodiments of the present application rather than all of the embodiments. All other embodiments obtained by a person of ordinary skill in the art based on the embodiments of the present application without creative efforts shall fall within the protection scope of the present application.

Embodiments of the present disclosure provide an information search method, apparatus, and system, a computer device, and a computer readable storage medium. The embodiments are described below.

Figure 1:
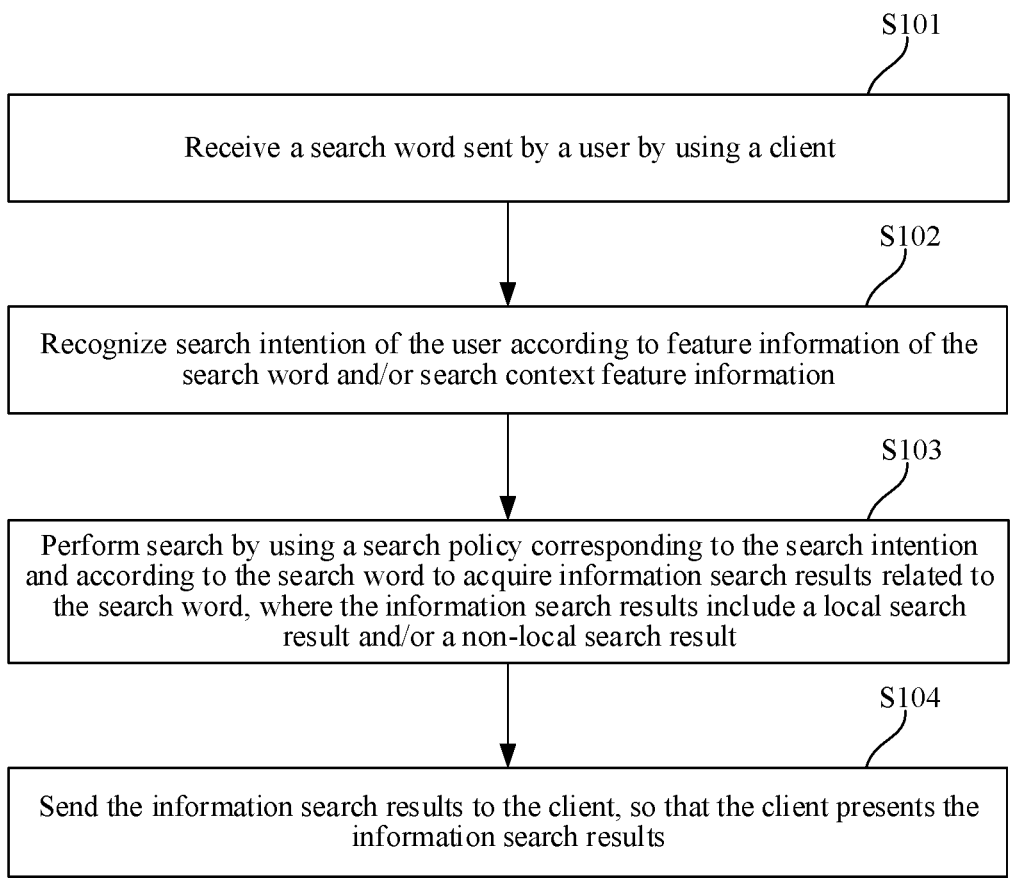
FIG. 1 is a schematic flowchart of an information search method applied to a server according to an embodiment of the present disclosure.

As shown in FIG. 1, a first embodiment of the present disclosure provides an information search method. The method is performed by a server. The method includes step S101 to step S104, which are specifically as follows:

step S101: receive a search word sent by a user by using a client.

step S102: recognize search intention of the user according to feature information of the search word and/or search context feature information.

step S103: perform search by using a search policy corresponding to the search intention and according to the search word to acquire information search results associated with the search word, where the information search results include a local search result and/or a non-local search result.

step S104: send the information search results to the client, so that the client displays the information search results.

In the first embodiment of the present disclosure, the user enters the search word on the client. After monitoring the entered search word, the client sends the search word to a server to perform search. After receiving the search word, the server first needs to recognize the search intention to determine the search intention of the user, and then performs search by using the corresponding search policy according to the search intention of the user.

It should be noted that in this embodiment of the present disclosure, "local" and "non-local" are described based on a current positioning city of the client. A current positioning city or district of the client is a local city or district, and a city or district other than the current positioning city or district is a non-local city or district.

The search intention may include that the user has a non-local search requirement and that the user does not have a non-local search requirement to determine whether to perform non-local search and display non-local search results. That the user has a non-local search requirement may further include that the user has both a local search requirement and a non-local search requirement (for example, the user has relatively strong non-local search intention) and that the user has only a non-local search requirement (for example, the user has very strong non-local search intention). That the user does not have a non-local search requirement may be regarded as that the user has only a local search requirement (for example, the user does not have non-local search intention or has relatively weak non-local search intention).

The search intention is used to describe that the user intends to search local merchants, non-local merchants or both local merchants and non-local merchants. In real life, the user searches local merchants more often. Therefore, during the recognition of the search intention of the user, the search intention of the user may be determined according to the strength of the non-local search intention of the user. The strength of the non-local search intention of the user may be measured by using non-local search preference. The search intention of the user is determined according to the non-local search preference and a preset preference threshold condition. For example, when the non-local search preference is less than a first preference threshold, it may be determined that the user has only a local search requirement. When the non-local search preference is greater than the first preference threshold and less than a second preference threshold, it may be determined that the user has both a local search requirement and a non-local search requirement. When the non-local search preference is greater than the second preference threshold, it may be determined that the user has only a non-local search requirement.

The search intention of the user may be determined from two aspects. In one aspect, the search word entered by the user has its strength of non-local search intention. In the other aspect, the strength of the non-local search intention of the user is determined according to the context of search.

Therefore, in an example provided in the first embodiment of the present disclosure, the feature information of the search word and/or the search context feature information that can reflect the non-local search intention of the search word are/is first acquired, and the search intention of the user is then recognized according to the feature information of the search word and/or the search context feature information.

The feature information of the search word may be Click Through Rates (CTRs) of non-local search results in historical search results of the search word, a non-local search quantity of the search word or the like. For example, when the CTRs of the non-local search results in historical search records of the search word is greater than a preset threshold, it may be considered that the search word has relatively high non-local search intention. For another example, when a search quantity of the search word in non-local cities is greater than a preset threshold, it may be similarly considered that the search word has relatively high non-local search intention.

The search context feature information may include user feature information. The user feature information may be determined according to historical search behavior (for example, whether the user has searched non-local information), a resident city and recent active city, current location information, historical click behavior, historical purchase behavior, historical browsing behavior or the like of the user. The user feature information include, for example, a city change quantity within a specified period of time, the CTRs or click quantities of the non-local search results, a non-local order quantity or the like. The strength of the non-local search intention of the user may be determined according to at least one piece of the user feature information above, to determine the search intention of the user.

In addition, the search context feature information may include current quality of local search results. The quality of the local search results may be determined according to at least one of a quantity of local search results, historical CTRs of the local search results, or pre-estimated CTRs of local search results. The strength of the non-local search intention of the user may be determined according to the quality of the local search results, to determine the search intention of the user. For example, after the search word is received, local search is performed first. If a quantity of local search results is less than a preset quantity threshold of local search results or the historical CTRs of the local search results is less than a preset threshold of historical CTRs, it may be determined that the current quality of the local search results is relatively poor, it is more likely that the user may need to perform non-local search, and it may be determined that the user has a non-local search requirement (including that the user has both local and non-local search requirements and that the user has only a non-local search requirement, which may be distinguished by further setting a threshold condition).

It should be noted that the feature information of the search word and the search context feature information may be separately used as a recognition reference for the search intention of the user or may be used together as recognition references for the search intention of the user. For example, in step S102, the search intention of the user may be recognized according to only the feature information of the search word. If the search word entered by the user has relatively high non-local search intention (for example, is greater than a first search word non-local intention threshold), it may be directly determined that the user has a non-local search requirement (including that the user has both local and non-local search requirements and that the user has only a non-local search requirement, which may be distinguished by further setting a threshold condition). For another example, in step S102, the search intention of the user may be recognized according to only the search context feature information. If at least one piece of the search context feature information in the foregoing meets a corresponding preset threshold condition, it may be determined that the user has a non-local search requirement (including that the user has both local and non-local search requirements and that the user has only a non-local search requirement, which may be distinguished by further setting a threshold condition). For still another example, in step S102, the feature information of the search word and the search context feature information may further be combined to recognize the search intention of the user. Corresponding weights may be set for recognition references, and different search intention is weighted and calculated to determine final search intention. It can be easily understood that during the recognition of the search intention of the user, when there are more recognition references, the obtained search intention is more accurate, and search results that better satisfy requirements of users are provided to the user, thereby improving user experience.

In an embodiment of the present disclosure, the search intention of the user is recognized by using a logic regression model. The non-local search preference of the user is first determined by using a non-local search preference determination model which is obtained by training based on the logic regression model, and the search intention of the user is then determined according to the non-local search preference. Recognizing search intention of the user according to feature information of the search word and/or search context feature information includes: acquiring the feature information of the search word and/or the search context feature information; determining the non-local search preference of the user according to the feature information of the search word and/or the search context feature information and by using a pre-trained non-local search preference determination model; and determining the search intention of the user according to the non-local search preference and a preset preference threshold condition.

The preference threshold condition may include a first preference threshold. The preset preference threshold condition may be that if the non-local search preference is less than the first preference threshold, it is determined that the search intention of the user is that the user does not have a non-local search requirement, and if the non-local search preference is greater than the first preference threshold, it is determined that the search intention of the user is that the user has a non-local search requirement. For more precise determination, the preference threshold condition may also include a first preference threshold and a second preference threshold. The preset preference threshold condition may be that when the non-local search preference is less than the first preference threshold, it may be determined that the user has only a local search requirement; when the non-local search preference is greater than the first preference threshold and less than the second preference threshold, it may be determined that the user has both a local search requirement and a non-local search requirement; and when the non-local search preference is greater than the second preference threshold, it may be determined that the user has only a non-local search requirement.

In this way, the search intention of the user may be determined according to the non-local search preference of the user and the preset preference threshold condition. The non-local search preference determination model is a logic regression model, and may be obtained by the following training including: constructing the non-local search preference determination model by using a feature variable of the search word and/or a search context feature variable as an independent variable and using a non-local search preference feature as a dependent variable; acquiring training samples generated according to a plurality of search click historical records; and training the non-local search preference determination model by using the training samples.

In the non-local search preference determination model, an eigenvalue corresponding to a dependent variable, that is, the non-local search preference feature is the non-local search preference, an eigenvalue corresponding to a feature variable of the search word is the feature information of the search word, and an eigenvalue corresponding to the search context feature variable is the search context feature information.

In an embodiment of the present disclosure, the non-local search preference determination model is constructed by using a logic regression model. Specifically, the non-local search preference determination model is constructed by using the following Formula 1:

$$\mathrm{remote}_{prob}=\mathrm{sigmoid}(w_1x_1+w_2x_2+\ldots+w_nx_n), \quad \text{Formula 1:}$$

in the Formula 1, $\mathrm{remote}_{prob}$ represents the non-local search preference feature, represents an eigenvalue of an n-th feature variable, $w_n$ represents a weight corresponding to the n-th feature variable, a weight corresponding to each feature variable is determined by training according to chosen training samples, the function sigmoid is a threshold function of a neural network, and the threshold function is used to map a variable into a value between 0 and 1.

Based on the logic regression model, a plurality of recognition references (is the feature variables in the foregoing Formula 1) may be used to construct the non-local search preference determination model. A large quantity of search click historical records are then used to perform training, to determine the weight for each feature variable in the non-local search preference determination model. After training is completed, the non-local search preference determination model may be used to recognize the non-local search preference of the user. Specifically, according to recognition references selected during training (i.e., at least one of the feature information of the search word and the search context feature information), the corresponding recognition reference is entered (which is consistent with the feature variables in the foregoing model). The non-local search preference determination model can calculate and output the corresponding non-local search preference according to the recognition reference and the trained weight. The search intention of the user may be determined by comparing the non-local search preference with the preset preference threshold condition.

Based on the description of the foregoing embodiments, when the logic regression model is used to recognize the search intention of the user, more recognition references may be combined for recognition, so that the search intention of the user can be recognized more accurately, and search results that better satisfy requirements of users can be provided to the users, thereby improving user experience.

In an embodiment of the present disclosure, by combining data sources such as user search keywords and merchant information, a statistical rule and a machine learning algorithm model are used to establish a local and non-local entity word library to find out a potential entity word that has a non-local consumption possibility, for example, star-rated hotels, famous scenic spots or famous brand merchants. Before the step of recognizing search intention of the user according to feature information of the search word and/or search context feature information, the method further includes: matching the search word against a preset local and non-local entity word library, to determine whether the search word has a possibility of non-local search; and if there is a possibility of non-local search, performing the step of recognizing search intention of the user according to feature information of the search word and/or search context feature information.

By using the foregoing steps, search words may be initially screened, and the search intention of the user is further recognized when there is a possibility of non-local search. If there is no possibility of non-local search, local search is directly performed without needing to recognize the search intention of the user, so that search efficiency can be generally improved.

If it is determined whether the user has non-local search intention, search may further be performed by using a search policy corresponding to the search intention. For example, if the user does not have non-local search intention, the corresponding search policy is only performing local search. If the user has non-local search intention, the corresponding search policy may be performing both local search and non-local search. If the non-local search intention of the user is very strong (when the non-local search preference exceeds the preset second preference threshold, it may be considered that non-local search intention is very strong), the corresponding search policy may be performing only non-local search.

In an embodiment of the present disclosure, performing search by using a search policy corresponding to the search intention and according to the search word to acquire information search results associated with the search word includes: if the search intention is that the user has both local search intention and non-local search intention, performing local search and non-local search according to the search word, to obtain the information search results including a plurality of local search results and a plurality of non-local search results.

In consideration of that the information search results include both local search results and the non-local search results, if the local search results and the non-local search results are sorted in a hybrid manner, the user may get confused, and a sorting algorithm is more complex. Therefore, in an embodiment of the present disclosure, a technical solution of separately displaying local search results and non-local search results is used. Specifically, before the step of sending the information search results to the client, the method may further include: incorporating the plurality of local search results into a local search result display region, and incorporating the plurality of non-local search results into a non-local search result display region; determining a display order of the local search result display region and the non-local search result display region according to the non-local search preference of the user and/or quality of the local and non-local search results; and generating the information search results including the local search result display region and the non-local search result display region in the display order.

The display order of the local search result display region and the non-local search result display region may be determined according to the non-local search preference of the user and/or quality of the local and non-local search results. The quality of the local and non-local search results includes quality of the local search results and quality of the non-local search results. Both the quality of the local search results and the quality of the non-local search results may be represented by at least one of corresponding quantity of search results, historical CTRs, pre-estimated CTRs, and the like. For example, if the non-local search preference of the user is greater than a third preference threshold and less than or equal to the second preference threshold, the non-local search result display region may be arranged in front of the local search result display region, so that a display interface of the entire information search results better satisfies requirements of users. Similarly, if in the information search results, local search results are more and have relatively high historical CTRs but non-local search results are less and have relatively low historical CTRs, for example, if the non-local search preference of the user is greater than the first preference threshold and is less than or equal to the third preference threshold, the local search result display region may be arranged in front of the non-local search result display region. Certainly, in combination with the non-local search preference of the user and the quality of the local and non-local search results, a weighted calculation method is used to determine the display order of the local search result display region and the non-local search result display region. In this way, the obtained display interface of the information search results better satisfies requirements of users, thereby further improving user experience.

In consideration of that in the search results, there are a relatively large quantity of local search results and/or a relatively large quantity of non-local search results, if all the search results are displayed to the user at once, it may be inconvenient and troublesome for the user to read the search results. Therefore, in an embodiment of the present disclosure, the local search result display region is set as a collapsible display region. The collapsible display region only displays some local search results in a collapsed state, and may display more local search results in an expanded state. A control for controlling the collapsible display region to expand or collapse may be set on the collapsible display region. When the user clicks the control, the collapsible display region may be switched between an expanded state and a collapsed state.

Correspondingly, an arrangement order of the local search results in the local search result display region and a quantity of local search results displayed in a collapsed state may further be determined according to a preset rule. For example, in an embodiment of the present disclosure, after incorporating the plurality of local search results into a local search result display region, the method may further include: determining an order of the local search results in the local search result display region according to a pre-estimated CTR of each local search result; and determining a quantity of local search results displayed when the local search result display region is in a collapsed state.

Specifically, the pre-estimated CTRs of the local search results may be calculated, and the local search results are then sorted according to the pre-estimated CTRs. A specified quantity of local search results that rank high may be chosen as information displayed in the collapsed state.

The pre-estimated CTRs may be calculated by using a CTR pre-estimation algorithm. An appropriate prediction model and appropriate feature factors that affect clicks of users are selected and historical click log data is used as a training set in combination to train parameters of the prediction model, so that the parameters are applied to CTR pre-estimation of a new project to sort the local search results.

In another embodiment of the present disclosure, the non-local search result display region may further be set as a collapsible display region. The collapsible display region only displays some non-local search results in a collapsed state, and may display more non-local search results in an expanded state. A control for controlling the collapsible display region to expand or collapse may be set on the collapsible display region. When the user clicks the control, the collapsible display region may be switched between an expanded state and a collapsed state.

Correspondingly, an arrangement order of the non-local search results in the non-local search result display region and a quantity of non-local search results displayed in a collapsed state may further be determined according to a preset rule. For example, in an embodiment of the present disclosure, after incorporating the plurality of non-local search results into a non-local search result display region, the method may further include: determining an order of the non-local search results in the non-local search result display region according to a pre-estimated CTR of each non-local search result; and determining a quantity of non-local search results displayed when the non-local search result display region is in a collapsed state.

Specifically, the pre-estimated CTRs of the non-local search results may be calculated, and the non-local search results are then sorted according to the pre-estimated CTRs, and a specified quantity of non-local search results that rank high may be chosen as information displayed in the collapsed state.

In consideration of that user experience is better when an information search result display effect better satisfies requirements of users, during specific implementation, an arrangement order and display quantities of local and non-local results may further be adaptively determined according to the non-local search preference of the user, the search context feature information, and the quality of the local and non-local search results. For example, in a specific embodiment of the present disclosure, assuming that it is determined according to the non-local search preference of the user and the quality of the local and non-local search results that the local search result display region is displayed first, a quantity of results to be displayed in a collapsed state in the local search result display region may be estimated by using the following method.

First, three constraints may be set. The first constraint is pre-estimated CTRs of locations in local search results, the second constraint is a pre-estimated CTR of the first location (with the highest pre-estimated CTR) in the non-local search results, and the third constraint is a smoothing parameter a.

Based on the foregoing constraints, when the local search result display region is displayed first, a quantity of local search results that are at last locations of the local search results and have pre-estimated CTRs greater than a times of the pre-estimated CTR of the first result of the non-local search results may be used as a local search result display quantity, and the quantity is the quantity of local search results to be displayed.

Similarly, when the non-local search result display region is displayed first, a quantity of non-local search results that are at last locations of the non-local search results and have pre-estimated CTRs greater than a times of the pre-estimated CTR of the first result of the local search results may be used as a non-local search result display quantity, and the quantity is the quantity of non-local search results to be displayed.

By using the foregoing implementation, the quantity of search results to be displayed in a display region in a collapsed state may be flexibly determined, so that the quantity better satisfies requirements of users, thereby further optimizing a display effect of an information search result page and improving user experience.

Specifically, before sending the information search results to the client, a plurality of local search results and non-local search results are first sorted, and a quantity of local search results and a quantity of non-local search results to be displayed are determined, so that the client displays the plurality of local search results and non-local search results according to an order after receiving the information search results. The arrangement order of the information search results (that is, a display order of the information search results on the client) is:

(1) After it is recognized that the user has non-local search intention and local search results are displayed first, a first preset quantity of local search results are displayed first in a descending order of pre-estimated CTRs of the local search results, and a second preset quantity of non-local search results are then displayed in a descending order of pre-estimated CTRs of the non-local search results. A difference between the pre-estimated CTR of the last displayed local search result and $\alpha$ times of the pre-estimated CTR of the non-local search results displayed first is greater than 0. In consideration of that a local search service is mainly provided during search, a display quantity threshold corresponding to the second preset quantity may be preset to control the maximum quantity of non-local search results that can be displayed.

(2) After it is recognized that the user has non-local search intention and non-local search results are displayed first, a third preset quantity of non-local search results are first displayed in a descending order of pre-estimated CTRs of non-local search results, and a fourth preset quantity of local search results are then displayed in a descending order of pre-estimated CTRs of the local search results. A difference between the pre-estimated CTR of the last displayed non-local search result and a times of the pre-estimated CTR of the first displayed local search result is greater than 0. In consideration of that a local search service is mainly provided during search, a display quantity threshold corresponding to the third preset quantity may be preset to control the maximum quantity of non-local search results that can be displayed.

In consideration of that the information search results obtained based on the foregoing embodiments of the present disclosure may not satisfy actual requirements of users one hundred percent, in an embodiment of the present disclosure, after the information search results are sent to the client, a click operation log of the user on the information search results may further be acquired, and iterative optimization is then performed on the non-local search preference determination model according to the click operation log. In the iterative optimization, the search context feature information may be extracted according to the click operation log and then added to training samples of the non-local search preference determination model. New training samples are used to perform iterative training on the non-local search preference determination model. After iterative optimization is performed according to a large quantity of click operation logs, an accumulative effect may take place, thereby improving the accuracy of the non-local search preference output by the non-local search preference determination model during subsequent use. Through continuous optimization, the accuracy of recognizing the non-local search intention of the user can be continuously improved in the first embodiment of the present disclosure, and a display form of the information search results (for example, after optimization, the display order of the local result display region and the non-local result display region may change) better satisfies requirements of users.

Figure 2:
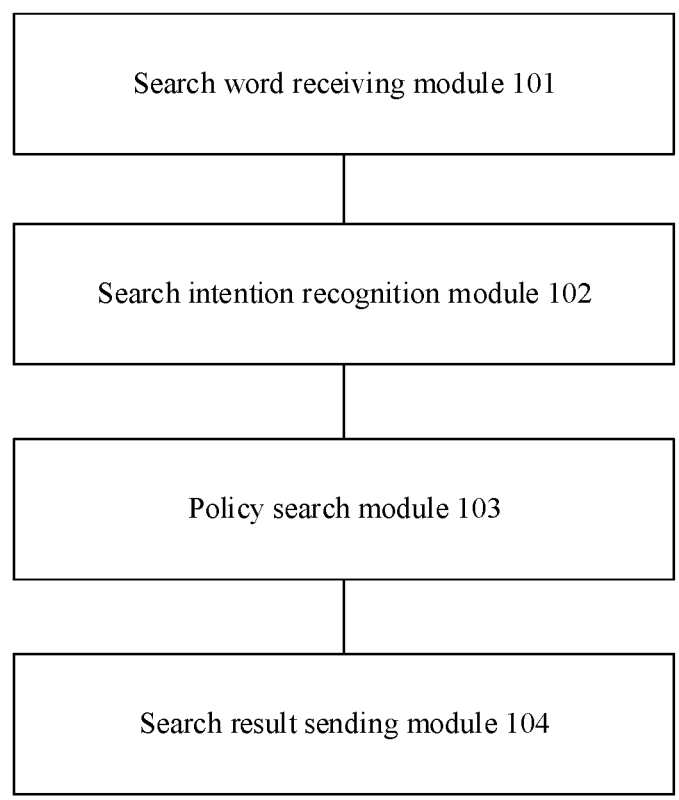
FIG. 2 is a schematic structural diagram of an information search apparatus applied to a server according to another embodiment of the present disclosure.

Corresponding to the method in FIG. 1, as shown in FIG. 2, the first embodiment of the present disclosure further provides an information search apparatus. The apparatus is configured in a server. The apparatus includes:

a search word receiving module 101, configured to receive a search word sent by a user by using a client;

a search intention recognition module 102, configured to recognize search intention of the user according to feature information of the search word and/or search context feature information;

a policy search module 103, configured to perform search by using a search policy corresponding to the search intention and according to the search word to acquire information search results associated with the search word, where the information search results include a local search result and/or a non-local search result; and a search result sending module 104, configured to send the information search results to the client, so that the client displays the information search results.

In an embodiment of the present disclosure, the search intention recognition module 102 is specifically configured to: acquire the feature information of the search word and/or the search context feature information; determine non-local search preference of the user according to the feature information of the search word and/or the search context feature information and by using a pre-trained non-local search preference determination model; and determine the search intention of the user according to the non-local search preference and a preset preference threshold condition.

In an embodiment of the present disclosure, the non-local search preference determination model is trained in the following manner including: constructing the non-local search preference determination model by using a feature variable of the search word and/or a search context feature variable as an independent variable and using a non-local search preference feature as a dependent variable; acquiring training samples generated according to a plurality of search click historical records; and training the non-local search preference determination model by using the training samples.

In an embodiment of the present disclosure, the non-local search preference determination model is constructed by using a logic regression model.

In an embodiment of the present disclosure, the non-local search preference determination model is specifically constructed by using the following Formula 1:

$$\text{remote}_{prob} = \text{sigmoid}(w_1 x_1 + w_2 x_2 + \ldots + w_n x_n),\quad \text{Formula 1:}$$

in the Formula 1, $\text{remote}_{prob}$ represents the non-local search preference feature, $x_n$ represents an eigenvalue of an n-th feature variable, $w_n$ represents a weight corresponding to the n-th feature variable, a weight corresponding to each feature variable is determined by training according to chosen training samples, the function sigmoid is a threshold function of a neural network, and the threshold function is used to map a variable into a value between 0 and 1.

In an embodiment of the present disclosure, the information search apparatus may further include an entity word matching module configured to: match the search word against a preset local and non-local entity word library, to determine whether the search word has a possibility of non-local search, and if there is a possibility of non-local search, perform the step of recognizing search intention of the user according to feature information of the search word and/or search context feature information.

In an embodiment of the present disclosure, the policy search module 103 is specifically configured to: if the search intention is that the user has both local search intention and non-local search intention, perform local search and non-local search according to the search word, to obtain the information search results including a plurality of local search results and a plurality of non-local search results.

In an embodiment of the present disclosure, the information search apparatus may further include:

a result incorporation module, configured to: incorporate the plurality of local search results into a local search result display region, and incorporate the plurality of non-local search results into a non-local search result display region;

a display order determining module, configured to determine a display order of the local search result display region and the non-local search result display region according to the non-local search preference of the user and/or quality of the local and non-local search results; and a search result generation module, configured to generate the information search results including the local search result display region and the non-local search result display region in the display order.

In an embodiment of the present disclosure, the local search result display region is a collapsible display region. In this case, the information search apparatus may further include a local order determining module configured to: determine an order of the local search results in the local search result display region according to pre-estimated CTRs of the local search results, and determine a quantity of local search results displayed when the local search result display region is in a collapsed state.

In an embodiment of the present disclosure, the non-local search result display region is a collapsible display region.

In this case, the information search apparatus may further include a non-local order determining module configured to: determine an order of the non-local search results in the non-local search result display region according to pre-estimated CTRs of the non-local search results, and determine a quantity of non-local search results displayed when the non-local search result display region is in a collapsed state.

In an embodiment of the present disclosure, the information search apparatus may further include:

an operation log acquisition module, configured to acquire a click operation log of the user on the information search results; and an iterative optimization module, configured to perform iterative optimization on the non-local search preference determination model according to the click operation log.

The foregoing information search apparatus and the foregoing information search method are based on the same inventive concept and have the same beneficial effect. Details are not described herein again.

Figure 3:
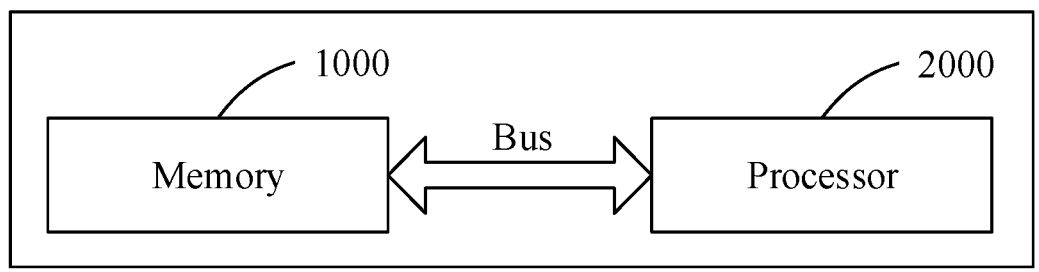
FIG. 3 is a schematic structural diagram of a computer device formed by modules according to still another embodiment of the present disclosure.

Corresponding to the method in FIG. 1, as shown in FIG. 3, the first embodiment of the present disclosure further provides a computer device. The device includes a memory 1000 and a processor 2000. The memory 1000 stores computer programs executable by the processor 2000. The processor 2000 runs the computer programs to perform the foregoing information search method.

Specifically, the memory 1000 may be a general-purpose memory, and the processor 2000 may be a general-purpose processor. This is not specifically limited herein. When the processor 2000 runs the computer programs stored in the memory 1000, the foregoing information search method can be implemented, to resolve the problems of complex operations and relatively low efficiency when non-local search is performed in related technologies, so that when having non-local search intention, a user can obtain non-local search results without needing to switch a current positioning city, thereby effectively improving search efficiency and improving user experience.

Corresponding to the method in FIG. 1, the first embodiment of the present disclosure further provides a computer readable storage medium. The computer readable storage medium stores computer programs. When executing the computer programs, a processor is caused to perform the foregoing information search method.

Specifically, the storage medium may be a general-purpose storage medium, for example, a removable disk or a hard disk. When the computer programs on the storage medium are run, the foregoing information search method can be implemented, to resolve the problems of complex operations and relatively low efficiency when non-local search is performed in related technologies, so that when having non-local search intention, a user can obtain non-local search results without needing to switch a current positioning city, thereby effectively improving search efficiency and improving user experience.

Figure 4:
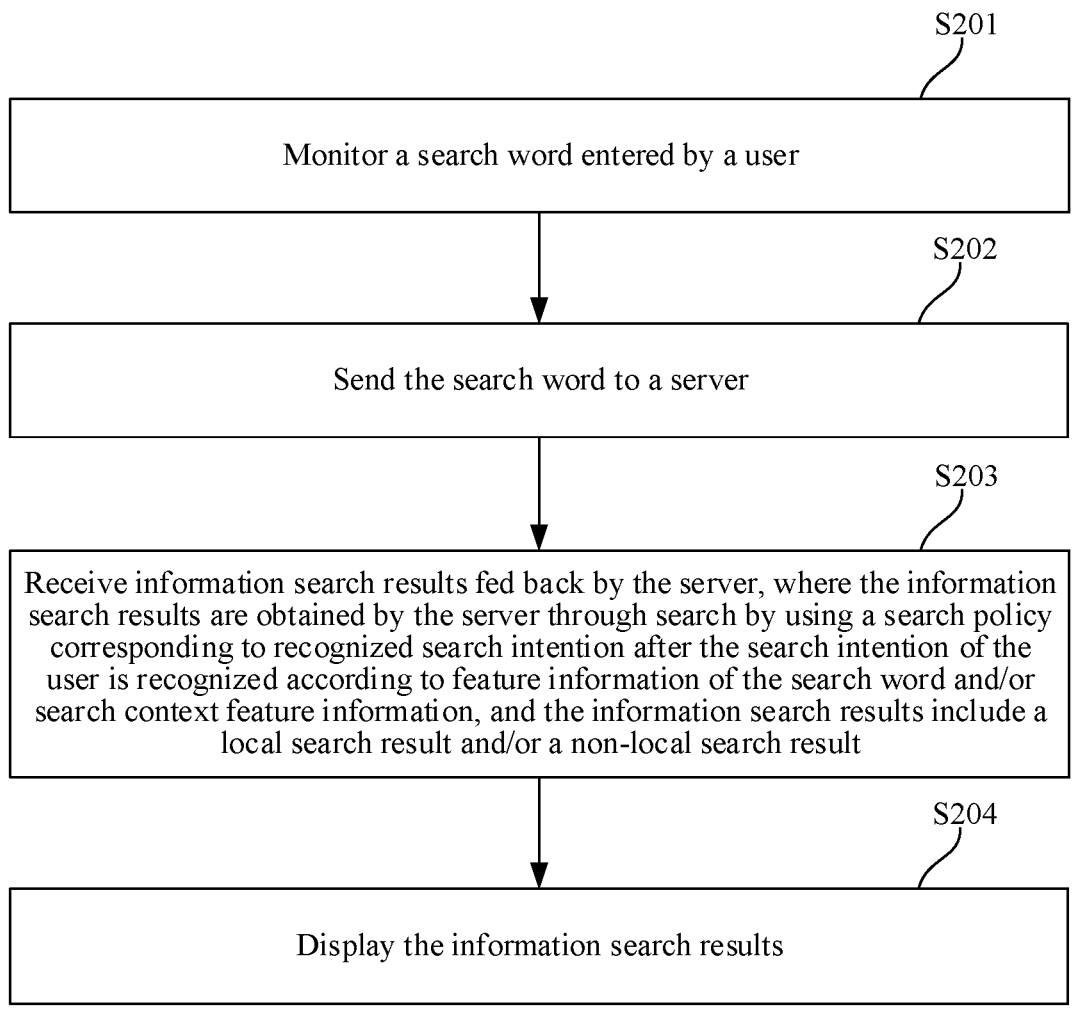
FIG. 4 is a schematic flowchart of an information search method applied to a client according to an embodiment of the present disclosure.

As shown in FIG. 4, a second embodiment of the present disclosure provides an information search method. The method is performed by a client. The method is implemented in combination with the information search method applied to a server provided in the first embodiment. For related parts, refer to the foregoing description of the first embodiment. Details are not described herein again. The second embodiment of the present disclosure only provides exemplary description. The information search method provided in the second embodiment of the present disclosure includes step S201 to step S204, which are specifically as follows:

step S201: monitor a search word entered by a user.

step S202: send the search word to a server.

step S203: receive information search results fed back by the server, where the information search results are obtained by the server through search by using a search policy corresponding to recognized search intention after the search intention of the user is recognized according to feature information of the search word and/or search context feature information, and the information search results include a local search result and/or a non-local search result.

step S204: display the information search results.

In an embodiment of the present disclosure, the information search results include a local search result display region, a non-local search result display region, and a display order, where the local search result display region includes a plurality of local search results, and the non-local search result display region includes a plurality of non-local search results.

Displaying the information search results includes: displaying the local search result display region and the non-local search result display region on the same screen of the client in the display order.

The foregoing information search method provided in the second embodiment of the present disclosure is implemented in combination with the foregoing information search method provided in the first embodiment, and the methods belong to the same inventive concept. Through the implementation in combination with the foregoing first embodiment, search results that better satisfy the intention of users can be obtained, so that when having non-local search intention, a user can obtain non-local search results without needing to switch a current positioning city, thereby effectively improving search efficiency and improving user experience.

Figure 5:
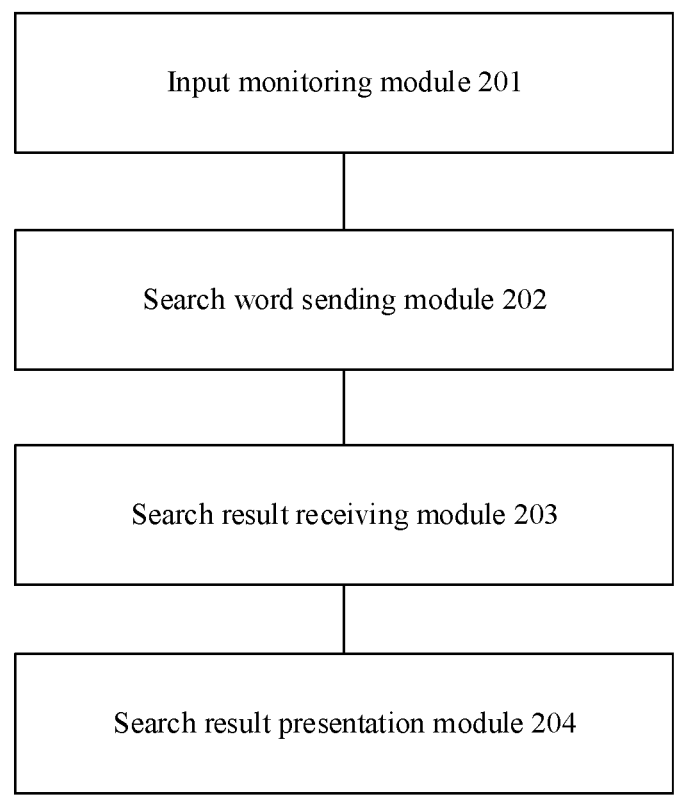
FIG. 5 is a schematic structural diagram of an information search apparatus applied to a client according to another embodiment of the present disclosure.

Corresponding to the method in FIG. 4, as shown in FIG. 5, the second embodiment of the present disclosure further provides an information search apparatus. The apparatus is configured in a client. The apparatus includes:

an input monitoring module 201, configured to monitor a search word entered by a user;

a search word sending module 202, configured to send the search word to a server;

a search result receiving module 203, configured to receive information search results fed back by the server, where the server uses a search policy corresponding to search intention of the user to perform search to acquire the information search results, the search intention of the user is recognized by the server according to feature information of the search word and/or search context feature information, and the information search results include a local search result and/or a non-local search result; and a search result display module 204, configured to display the information search results.

In an embodiment of the present disclosure, the information search results include a local search result display region, a non-local search result display region, and a display order, where the local search result display region includes a plurality of local search results, and the non-local search result display region includes a plurality of non-local search results.

The search result display module 204 is specifically configured to display the local search result display region and the non-local search result display region on the same screen of the client in the display order.

The foregoing information search apparatus provided in the second embodiment of the present disclosure and the foregoing information search method provided in the second embodiment of the present disclosure are based on the same inventive concept and have the same beneficial effect. Details are not described herein again.

Figure 6:
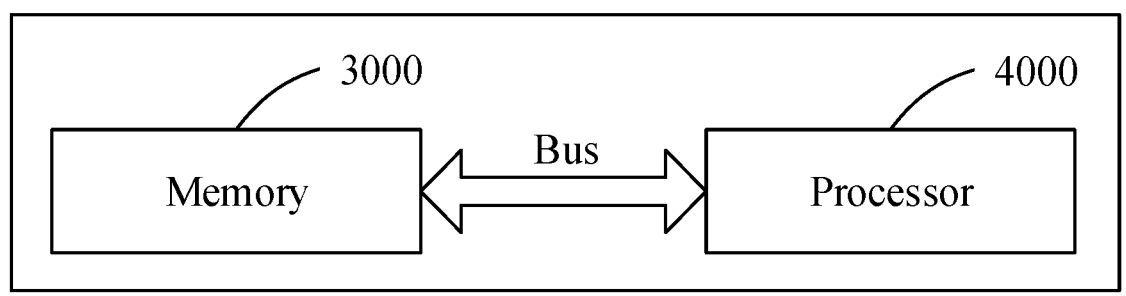
FIG. 6 is a schematic structural diagram of a computer device formed by modules according to still another embodiment of the present disclosure.

Corresponding to the method in FIG. 4, as shown in FIG. 6, the second embodiment of the present disclosure further provides a computer device. The device includes a memory 3000 and a processor 4000. The memory 3000 stores computer programs executable by the processor 4000. When executing the computer programs, the processor 4000 is caused to perform the foregoing information search method.

Specifically, the memory 3000 may be a general-purpose memory, and the processor 4000 may be a general-purpose processor. This is not specifically limited herein. When the processor 4000 runs the computer programs stored in the memory 3000, the foregoing information search method is implemented, to resolve the problems of complex operations and relatively low efficiency when non-local search is performed in related technologies, so that when having non-local search intention, a user can obtain non-local search results without needing to switch a current positioning city, thereby effectively improving search efficiency and improving user experience.

Corresponding to the method in FIG. 4, the second embodiment of the present disclosure further provides a computer readable storage medium. The computer readable storage medium stores computer programs. When executing the computer programs, a processor is caused to perform the foregoing information search method.

Specifically, the storage medium may be a general-purpose storage medium, for example, a removable disk or a hard disk. When the computer programs on the storage medium are run, the foregoing information search method is implemented, to resolve the problems of complex operations and relatively low efficiency when non-local search is performed in related technologies, so that when having non-local search intention, a user can obtain non-local search results without needing to switch a current positioning city, thereby effectively improving search efficiency and improving user experience.

Figure 7:
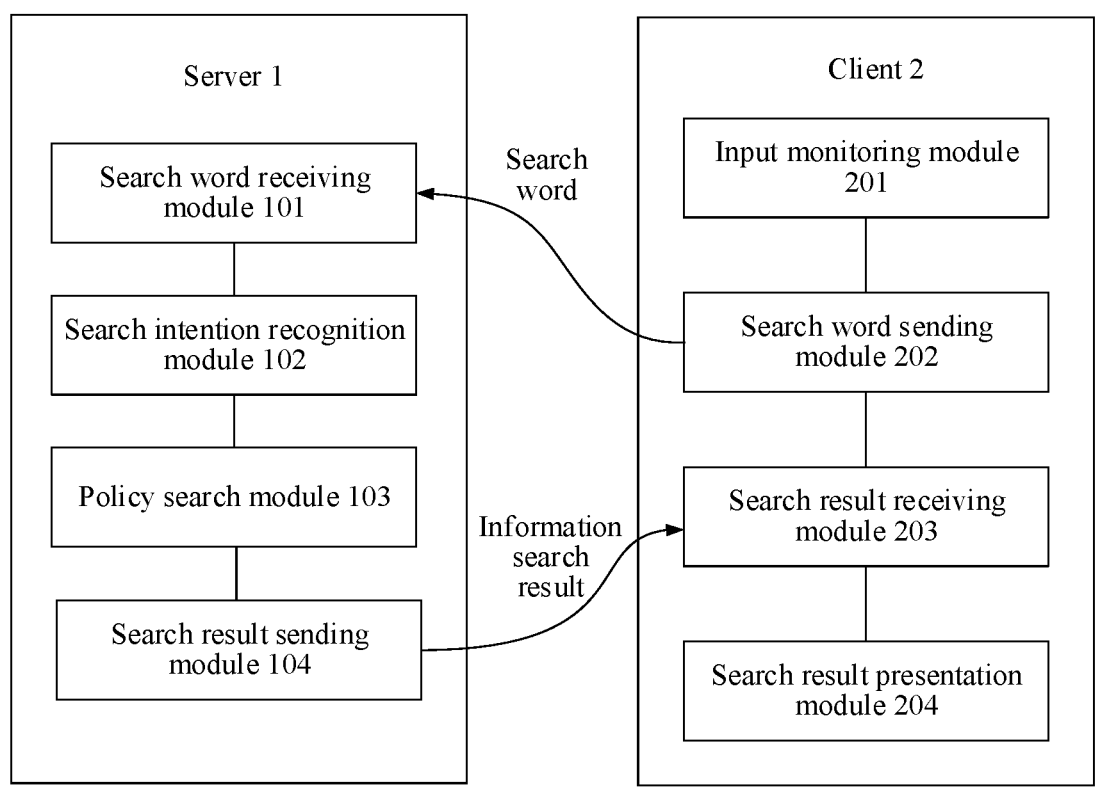
FIG. 7 is a schematic structural diagram of an information search system according to an embodiment of the present disclosure.

As shown in FIG. 7, a third embodiment of the present disclosure provides an information search system. The system includes a server 1 and a client 2. The server 1 includes the information search apparatus in the first embodiment. The client 2 includes the information search apparatus in the second embodiment.

The information search system provided in this embodiment of the present disclosure is implemented based on the foregoing information search apparatus provided in the first embodiment and the foregoing information search apparatus provided in the second embodiment, to resolve the problems of complex operations and relatively low efficiency when non-local search is performed in related technologies, so that when having non-local search intention, a user can obtain non-local search results without needing to switch a current positioning city, thereby effectively improving search efficiency and improving user experience.

The information search apparatus provided in the embodiments of the present disclosure may be specific hardware on a device or software, firmware or the like installed on the device. The implementation principle and produced technical effects of the apparatus provided in the embodiments of the present disclosure are the same as those in the foregoing method embodiments. For brevity, for certain parts not mentioned in the apparatus embodiments, refer to the corresponding content in the foregoing method embodiments. A person skilled in the art may clearly understand that, for the purpose of convenient and brief description, for a detailed working process of the foregoing described system, apparatus, and unit, refer to the corresponding process in the foregoing method embodiments, and details are not described herein again.

In the embodiments provided in this application, it should be understood that the disclosed apparatus and method may be implemented in other manners. The described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional module and sold or used as an independent product, the functions may be stored in a computer readable storage medium. Based on such an understanding, the technical solutions of the present disclosure essentially, or the part contributing to the prior art, or part of the technical solutions may be implemented in the form of a software product. The computer software product is stored in a storage medium, and includes several instructions for instructing a computer device (which may be a personal computer, a server, a network device, and the like) to perform all or some of the steps of the method described in the embodiments of the present disclosure. The foregoing storage medium includes any medium that can store program code, such as a universal serial bus (USB) flash drive, a removable hard disk, a read-only memory (ROM), a random access memory (RAM), a magnetic disk, or an optical disc.

It should be noted that similar reference numerals and letters in the following accompanying drawings represent similar items. Therefore, once an item is defined in an accompanying drawing, the item does not need to be further defined and explained in the subsequent accompanying drawings. In addition, the terms such as "first", "second", and "third" are used only for the purpose of differentiation, and should not be understood as indicating or implying the relative importance.

Finally, it should be noted that the above embodiments are merely specific implementations of the present disclosure and provided for describing the technical solutions of the present disclosure, but not intended to limit the present disclosure. The scope of protection of the present disclosure is not limited thereto. It should be understood by persons of ordinary skill in the art that although the present disclosure has been described in detail with reference to the embodiments, modifications or changes that are readily conceivable can be made to the technical solutions described in the embodiments, or equivalent replacements can be made to some technical features in the technical solutions. Such modifications, changes or replacements do not make the essence of the corresponding technical solutions depart from the spirit and scope of the technical solutions in the embodiments of the present disclosure. Therefore, the scope of protection of the present disclosure should be as defined by the scope of protection of the claims.

The invention claimed is:

1. A method of searching for information, comprising:
receiving, by a server, a search word sent by a user by using a client;
recognizing, by the server, search intention of the user according to feature information of the search word and/or search context feature information;
performing, by the server, search by using a search policy corresponding to the search intention and according to the search word to acquire information search results associated with the search word, wherein the information search results comprise a local search result and/or a non-local search result; and
sending, by the server, the information search results to the client to enable the client to display the information search results,
wherein recognizing the search intention of the user according to the feature information of the search word and/or the search context feature information comprises:
acquiring, by the server, the feature information of the search word and/or the search context feature information;
determining, by the server, non-local search preference of the user according to the feature information of the search word and/or the search context feature information and by using a pre-trained non-local search preference determination model; and
determining, by the server, the search intention of the user according to the non-local search preference and a preset preference threshold condition,
wherein the non-local search preference determination model is trained by:
constructing, by the server, the non-local search preference determination model by using a feature of the search word and/or a search context feature as an independent variable and using a non-local search preference feature as a dependent variable;
acquiring, by the server, training samples generated according to a plurality of search click historical records; and
training, by the server, the non-local search preference determination model by using the training samples,
wherein constructing the non-local search preference determination model comprises:
constructing, by the server, the non-local search preference determination model by using a logic regression model using the following:
$remote_{prob}$=sigmoid $(w_1x_1+w_2x_2+ \ldots +w_nx_n)$, wherein
$remote_{prob}$ represents the non-local search preference feature,
$x_n$ represents an eigenvalue of an n-th feature,
$w_n$ represents a weight corresponding to the n-th feature, a weight corresponding to each of the n features is determined by training according to chosen training samples, and
the function sigmoid is a threshold function of a neural network, and the threshold function is used to map a variable into a value between 0 and 1.

2. The method according to claim 1, further comprising:
matching, by the server, the search word against a preset local and non-local entity word library, to determine whether the search word has a possibility of non-local search; and
if there is a possibility of non-local search, recognizing, by the server, the search intention of the user according to the feature information of the search word and/or the search context feature information.

3. The method according to claim 1, wherein performing search by using the search policy corresponding to the search intention and according to the search word to acquire information search results associated with the search word comprises:
if the search intention is that the user has both local search intention and non-local search intention, performing, by the server, local search and non-local search according to the search word, to obtain the information search results comprising a plurality of local search results and a plurality of non-local search results.

4. The method according to claim 3, further comprising:
incorporating, by the server, the plurality of local search results into a local search result display region;
incorporating, by the server, the plurality of non-local search results into a non-local search result display region;
determining, by the server, a display order of the local search result display region and the non-local search result display region according to non-local search preference of the user and/or quality of the local and non-local search results; and
generating, by the server, the information search results comprising the local search result display region and the non-local search result display region in the display order.

5. The method according to claim 4, further comprising:
determining, by the server, an order of the plurality of local search results in the local search result display region according to a pre-estimated click through rate of each of the plurality of the local search results, and
determining, by the server, a quantity of local search results displayed when the local search result display region is in a collapsed state.

6. The method according to claim 4, further comprising:
determining, by the server, an order of the plurality of the non-local search results in the non-local search result display region according to a pre-estimated click through rate of each of the plurality of the non-local search results, and
determining, by the server, a quantity of non-local search results displayed when the non-local search result display region is in a collapsed state.

7. The method according to claim 1, further comprising:
acquiring, by the server, a click operation log of the user on the information search results; and
performing, by the server, iterative optimization on the non-local search preference determination model according to the click operation log.

8. A method of searching for information, comprising:
monitoring, by a client, a search word entered by a user;
sending, by the client, the search word to a server;
receiving, by the client, information search results fed back by the server, wherein the server uses a search policy corresponding to search intention of the user to perform search to acquire the information search results, the search intention of the user being recognized by the server according to feature information of the search word and/or search context feature information, and the information search results comprise a local search result and/or a non-local search result; and displaying, by the client, the information search results, wherein the search intention of the user being recognized by the server according to feature information of the search word and/or search context feature information comprises:

acquiring, by the server, the feature information of the search word and/or the search context feature information;

determining, by the server, non-local search preference of the user according to the feature information of the search word and/or the search context feature information and by using a pre-trained non-local search preference determination model; and determining, by the server, the search intention of the user according to the non-local search preference and a preset preference threshold condition, wherein the non-local search preference determination model is trained by:

constructing, by the server, the non-local search preference determination model by using a feature of the search word and/or a search context feature as an independent variable and using a non-local search preference feature as a dependent variable;

acquiring, by the server, training samples generated according to a plurality of search click historical records; and training, by the server, the non-local search preference determination model by using the training samples, wherein constructing the non-local search preference determination model comprises:

constructing, by the server, the non-local search preference determination model by using a logic regression model using the following:

remote$_{prob}$=sigmoid $(w_1x_1+w_2x_2+ \ldots +w_nx_n)$, wherein remote$_{prob}$ represents the non-local search preference feature, $x_n$ represents an eigenvalue of an n-th feature, $w_n$ represents a weight corresponding to the n-th feature, a weight corresponding to each of the n features is determined by training according to chosen training samples, and the function sigmoid is a threshold function of a neural network, and the threshold function is used to map a variable into a value between 0 and 1.

9. The method according to claim 8, wherein displaying the information search results comprises:

displaying, by the client, a local search result display region and a non-local search result display region in the information search results on the same screen of the client in a display order of the information search results, wherein the local search result display region comprises at least one local search result, and the non-local search result display region comprises at least one non-local search result.

10. A computer device, comprising:

a memory;

a processor; and computer programs stored in the memory and executable by the processor;

wherein when executing the computer programs, the processor is caused to perform the method according to claim 1.

11. A computer device, comprising:

a memory;

a processor; and computer programs stored in the memory and executable by the processor;

wherein when executing the computer programs, the processor is caused to perform the method according to claim 8.

12. A computer readable storage medium storing computer programs, wherein when executing the computer programs, a processor is caused to perform the method according to claim 1.

13. A computer readable storage medium storing computer programs, wherein when executing the computer programs, a processor is caused to perform the method according to claim 8.

* * * * *